United States Patent
Malmberg et al.

(10) Patent No.: US 12,031,425 B2
(45) Date of Patent: Jul. 9, 2024

(54) METHOD FOR DETERMINING IF A WELLBORE CONSISTS OF MICRO ANNULUS, FREE PIPE OR SOLID BONDING BETWEEN THE WELLBORE AND A CASING

(71) Applicant: Equanostic AS, Oslo (NO)

(72) Inventors: Jenny-Ann Malmberg, Billingstad (NO); Erlend Kvinge Jørgensen, Oslo (NO); Tore Lie Sirevaag, Oslo (NO); Stig Støa, Oslo (NO)

(73) Assignee: Equanostic AS, Oslo (NO)

( * ) Notice: Subject to any disclaimer, the term of this patent is extended or adjusted under 35 U.S.C. 154(b) by 150 days.

(21) Appl. No.: 17/818,020

(22) Filed: Aug. 8, 2022

(65) Prior Publication Data

US 2023/0039040 A1     Feb. 9, 2023

(51) Int. Cl.
  *E21B 47/005*    (2012.01)
  *G01N 29/11*    (2006.01)

(52) U.S. Cl.
  CPC ............ *E21B 47/005* (2020.05); *G01N 29/11* (2013.01); *G01N 2291/044* (2013.01)

(58) Field of Classification Search
  CPC . E21B 47/005; G01N 29/11; G01N 2291/044
  See application file for complete search history.

(56) References Cited

U.S. PATENT DOCUMENTS

| | | |
|---|---|---|
| 3,401,773 A | 9/1968 | Synnott |
| 4,255,798 A | 3/1981 | Havira |
| 5,278,805 A | 1/1994 | Kimball |
| 5,357,481 A | 10/1994 | Lester et al. |

(Continued)

FOREIGN PATENT DOCUMENTS

| | | |
|---|---|---|
| GB | 2008756 A | 6/1979 |
| WO | 2019236832 A1 | 12/2019 |

OTHER PUBLICATIONS

He et al., "Ultrasonic leaky flexural waves in multilayered media: Cement bond detection for cased wellbores." Geophysics 79.2 (2014): A7-A11. 5 pages.

(Continued)

*Primary Examiner* — Isam A Alsomiri
*Assistant Examiner* — Abdallah Abulaban
(74) *Attorney, Agent, or Firm* — Smith Baluch LLP

(57) ABSTRACT

Material properties between a wellbore and a casing having a partition separating respective domains inside and outside the casing are evaluated by disposing at least one ultrasonic transmitter and a plurality of ultrasonic receivers in longitudinally spaced-apart relationship alongside the partition inside the casing. The ultrasonic transmitter is activated to form ultrasonic waveforms comprising propagated quasi leaky-Lamb waves constituting flexural waves having symmetric and antisymmetric zero-order modes within the partition. A time-shift is applied to the received flexural waves so that the respective time-shifted waveforms corresponding to each of the flexural waves arrive at the same time. The time-shifted waveforms are clustered to form separate clusters respectively relating to a flexural wave part, and at least one post-flexural wave part which exposes characteristics that would otherwise be hidden behind more dominant features in the flexural wave and allowing determination of a material and geometry behind the partition.

18 Claims, 12 Drawing Sheets

(56) References Cited

U.S. PATENT DOCUMENTS

| | | |
|---|---|---|
| 5,591,945 A | 1/1997 | Kent |
| 6,018,496 A | 1/2000 | Stanke et al. |
| 6,483,777 B1 | 11/2002 | Zeroug |
| 6,681,185 B1 | 1/2004 | Young et al. |
| 7,149,146 B2 | 12/2006 | Kuijk et al. |
| 7,681,450 B2 | 3/2010 | Bolshakov et al. |
| 7,697,375 B2 | 4/2010 | Reiderman et al. |
| 7,773,454 B2 | 8/2010 | Barolak et al. |
| 7,787,327 B2 | 8/2010 | Tang et al. |
| 8,964,504 B2 | 2/2015 | Chace et al. |
| 9,534,487 B2 | 1/2017 | Zeroug et al. |
| 9,664,034 B2 | 5/2017 | Mandal |
| 9,732,607 B2 | 8/2017 | Zeroug et al. |
| 9,772,419 B2 | 9/2017 | Haldorsen et al. |
| 9,784,875 B2 | 10/2017 | Zeroug et al. |
| 10,138,727 B2 | 11/2018 | Zeroug et al. |
| 10,344,582 B2 | 7/2019 | Merciu |
| 10,481,289 B2 | 11/2019 | Merciu |
| 10,761,064 B2 | 9/2020 | Zeroug |
| 10,809,405 B2 | 10/2020 | Zeroug et al. |
| 11,098,583 B1 | 8/2021 | Sirevaag |
| 11,143,016 B2 | 10/2021 | Sirevaag et al. |
| 2004/0019428 A1 | 1/2004 | Young et al. |
| 2006/0133205 A1 | 6/2006 | Van Kuijk et al. |
| 2006/0198243 A1 | 9/2006 | Tang et al. |
| 2006/0233048 A1 | 10/2006 | Froelich et al. |
| 2007/0211572 A1 | 9/2007 | Reiderman et al. |
| 2009/0231954 A1 | 9/2009 | Bolshakov et al. |
| 2012/0075953 A1 | 3/2012 | Chace et al. |
| 2014/0056101 A1 | 2/2014 | Vu et al. |
| 2014/0177389 A1 | 6/2014 | Bolshakov et al. |
| 2015/0198732 A1 | 7/2015 | Zeroug et al. |
| 2015/0218930 A1 | 8/2015 | Zeroug et al. |
| 2015/0219780 A1 | 8/2015 | Zeroug et al. |
| 2015/0331134 A1 | 11/2015 | Haldorsen et al. |
| 2016/0047238 A1 | 2/2016 | Zeroug et al. |
| 2016/0209539 A1 | 7/2016 | Calvez et al. |
| 2017/0090057 A1 | 3/2017 | Thierry et al. |
| 2017/0090058 A1 | 3/2017 | Brill |
| 2017/0139072 A1 | 5/2017 | Kalyanraman et al. |
| 2017/0350231 A1 | 12/2017 | Merciu |
| 2018/0067223 A1 | 3/2018 | Calvez et al. |
| 2018/0142545 A1 | 5/2018 | Lei et al. |
| 2018/0149019 A1 | 5/2018 | Bose et al. |
| 2018/0156759 A1 | 6/2018 | Lei et al. |
| 2018/0196157 A1 | 7/2018 | Zeroug et al. |
| 2018/0306751 A1 | 10/2018 | Zeroug |
| 2018/0328163 A1 | 11/2018 | Hayman et al. |
| 2020/0049850 A1 | 2/2020 | Liu et al. |
| 2020/0072040 A1 | 3/2020 | Liu et al. |
| 2020/0300077 A1 | 9/2020 | Matuszyk et al. |
| 2021/0032973 A1 | 2/2021 | Gkortsas et al. |

OTHER PUBLICATIONS

Li et al., "Natural beam focusing of non-axisymmetric guided waves in large-diameter pipes." Ultrasonics 44.1 (2006): 35-45.

Nelson, "A universal dispersion curve for flexural wave propagation in plates and bars." Journal of Sound and Vibration 18.1 (1971): 93-100.

Rose et al., "Ultrasonic Waves in Solid Media." ASAJ 107.4 (2000): 1807-1808.

Sirevaag (Abstract from PHD Thesis) "A Study of the Ultrasonic Measurements for Logging Behind a Steel Pipe: Expanding the processing to improve the differentiation between heavy fluids and light solids." Norwegian University of Science and Technology (NTNU) 2020, 1 page.

Sirevaag, "Ultrasonic borehole logging: Expanding the processing of the ultrasonic measurements to improve the evaluation of logging behind the casing." PhD thesis, Norwegian University of Science and Technology (NTNU) 2019. 164 pages.

United Kingdom Search Report in GB Application GB2111437.6 dated May 18, 2022, 4 pages.

Van Kuijk et al., "A novel ultrasonic cased-hole imager for enhanced cement evaluation." International petroleum technology conference. International Petroleum Technology Conference, 2005. 14 pages.

Velichko et al., "Excitation and scattering of guided waves: Relationships between solutions for plates and pipes." The Journal of the Acoustical Society of America 125.6 (2009): 3623-3631.

Viggen et al., "Analysis of outer-casing echoes in simulations of ultrasonic pulse-echo through-tubing logging." Geophysics 81.6 (2016): D679-D685. 7 pages.

Viggen et al., "Simulation and modeling of ultrasonic pitch-catch through-tubing logging." Geophysics 81.4 (2016): D383-D393. 12 pages.

Zeroug et al., "Ultrasonic leaky-Lamb wave imaging through a highly contrasting layer." IEEE Symposium on Ultrasonics, 2003. vol. 1. IEEE, 2003. Abstract only. 3 pages.

Zeroug et al., "Ultrasonic leaky-Lamb wave imaging through a highly contrasting layer." IEEE Symposium on Ultrasonics, 2003. vol. 1. IEEE, 2003. 5 pages.

METHOD FOR DETERMINING IF A WELLBORE CONSISTS OF MICRO ANNULUS, FREE PIPE OR SOLID BONDING BETWEEN THE WELLBORE AND A CASING

CROSS-REFERENCE TO RELATED APPLICATION(S)

The present application claims priority to UK App. No. GB2111437.6, which was filed on Aug. 9, 2021, and which is incorporated herein by reference in its entirety for all purposes.

FIELD OF THE INVENTION

The present invention relates to evaluating the geometrical condition and the material on one side of a partition using ultrasonic measurements.

PRIOR ART

Prior art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] Li, J. and J. L. Rose (2006): *Natural beam focusing of non-axisymmetric guided waves in large-diameter pipes*. Ultrasonics 44(1): 35-45.
[2] Rose, J. L: *Ultrasonic Waves in Solid Media* (2000) 107(4): 1807-1808.
[3] Sirevaag, T. PhD thesis *A Study of the Ultrasonic Measurements for Logging Behind a Steel Pipe: Expanding the processing to improve the differentiation between heavy fluids and light solids*, Norwegian University of Science and Technology (NTNU).
[4] Tang, X. M, Bolshakov, A., Barolak, J., Patterson, D., Dubinsky, V., Alers, R., Alers, G., US 2006198243 *Use of lamb waves in cement bond logging*.
[5] van Kuijk, R., S. Zeroug, B. Froelich, M. Allouche, S. Bose, D. Miller, J.-L. Le Calvez, V. Schoepf and A. Pagnin: *A Novel Ultrasonic Cased-Hole Imager for Enhanced Cement Evaluation*, International Petroleum Technology Conference (2005).
[6] Velichko, A, Wilcox P D: *Excitation and scattering of guided waves: relationships between solutions for plates and pipes*, J Acoustic Soc Am. 2009 June; 125(6):3623-31. doi: 10.1121/1.3117441.
[7] Viktorov, I. A: *Rayleigh and Lamb waves: physical theory and applications*. New York, Plenum Press (1967).
[8] Zeroug, S., Yang, J. & Bose, S. U.S. Pat. No. 9,534,487 *Cement acoustic properties from ultrasonic signal amplitude dispersions in cased wells*.
[9] Zeroug, S., Sinha, B. K., Bose, S., Yang, J. Lei, T., & Kalyanaraman, R. S., U.S. Pat. No. 10,138,727 *Acoustic multi-modality inversion for cement integrity analysis*.
[10] Velichko, A,: *Excitation and scattering of guided waves: relationships between solutions for plates and pipes*, J Acoustic Soc Am. 2009 June; 125(6):3623-31. doi: 10.1121/1.3117441.
[11] Sirevaag, T. et al. US 2021-0140302 *Method for Evaluating a Material on a Remote Side of a Partition using Ultrasonic Measurements*, published May 13, 2021.

BACKGROUND

Deep surface wells are created by drilling a hole into the earth with a drilling rig that rotates a drill string with a bit attached. After the hole is drilled to a prescribed depth, sections of steel tubing known as casing are set in the hole. To be able to lower it down, the casing is of slightly narrower bore than the borehole. The small space between the surrounding solid geological formation and the casing is cemented in order to prevent oil and gas migrating up to the surface. This is done by pushing the cement down to the end of casing and squeezing it from the prescribed depth and up the annulus. During the drilling, completion and permanent closure of an oil well, it is a challenge to verify if the cement has been squeezed up the annulus and bonded to the outside of the casing surface. If no pressure test is planned, the primary method to validate that the annulus is impermeable, is to use ultrasonic borehole logging. To improve the identification of whether an impermeable solid is bonding onto the casing, efforts have been made to provide solutions for using ultrasonic logging in the field.

US2006198243 [4] discloses a method and apparatus for determining the integrity of a cement bond log disposed in the annular space between a casing and a wellbore. The method and apparatus induce a Lamb wave in the casing and into the wellbore. The Lamb wave attenuates upon passage beside the cement bond. The integrity of the cement bond log can be determined by analysis and evaluation of the attenuation results.

U.S. Pat. No. 9,534,487 [8] uses a transmitter and several receivers to measure the zero-order mode ($S_0$) symmetric extensional Lamb waveforms. These are processed to obtain the amplitude attenuation dispersion plot and phase dispersion plot as functions of frequency as means to characterize the physical state of a casing and annular fill outside the casing. The technique obtains information by transmitting a pressure wave ($T_1$) with oblique incidence at the casing wall that excites a guided wave propagating upwards in the casing. The guided wave leaks off energy as it propagates, and the leaked off pressure wavefront is measured at receivers positioned further up the well. Since Lamb waves leak energy as they propagate, the waves are constantly attenuated as the distance increases.

U.S. Pat. No. 9,534,487 also estimates the amplitude attenuation dispersion and phase dispersion of the extensional Lamb wave, where the ultrasonic waveforms are processed to obtain (i) an amplitude attenuation dispersion plot of attenuation as a function of frequency and (ii) a phase dispersion plot of phase velocity as a function of frequency. Barrier wavespeeds are determined by identifying discontinuities within the amplitude attenuation dispersion plot, which are then related to the discontinuities to barrier wavespeeds using the phase dispersion plot.

U.S. Pat. No. 10,138,727 [10] processes the zero-order mode antisymmetric Lamb flexural waveforms to identify barrier parameters as a function of azimuth and depth along the borehole, wherein the waveforms comprise at least two of sonic signals, ultrasonic pulse-echo signals, and ultrasonic pitch-catch signals. The patent states that the pre-processing extract attributes particular to each measurement such as decay rate for the pulse echo and attenuation for the flexural and extensional modes. These attributes are then compared to a multi-dimensional library of pre-calculated attributes as a function of cement properties and bond properties. A match up to a specific criterion provides the set of inverted cement parameters. The attenuation can be estimated across two or more receivers. Two attributes can be used: the energy envelope peak decay as well as the attenuation dispersion (i.e., as a function of frequency).

US2016209539 discloses methods and systems for separating leaky-Lamb modes to evaluate cylindrically layered structures. Embodiments involve receiving acoustic cement evaluation data from one or more acoustic downhole tools used over a depth interval in a well having a casing. Embodiments also involve determining an extensional mode component and a flexural mode component of the leaky-Lamb wave measurements and determining a flexural wave attenuation based on the flexural mode component of the leaky-Lamb wave measurement.

US2015218930 discloses systems and methods for estimating an acoustic property of an annulus in a cement evaluation system.

Reference is also made to the following publications:

Xiao He et al. "*Ultrasonic leaky flexural waves in multilayered media: Cement bond detection for cased wellbores*", March 2014, Geophysics 79(2): A7-A11. This publication investigates ultrasonic leaky flexural modes in radially multilayered media through finite-difference modeling to evaluate cementing for the whole annulus of a casing.

Erlend Magnus Viggen et al., "*Simulation and modeling of ultrasonic pitch-catch through-tubing logging*," July 2016, Geophysics 81: D383-D393. This publication discloses the use of a finite-element model of a double-casing geometry with a two-receiver pitch-catch setup for logging in double-casing geometries.

SUMMARY OF THE INVENTION

In accordance with the invention there are provided methods for evaluating the geometry and the material on a remote side of a partition having the features of the independent claims.

The present invention differs from known methods such as disclosed in [8,9] in evaluating much more of the data within the waveforms, not just analyzing the flexural wave, but incorporating the wave mode(s) arriving just after the flexural wave. The inventors have discovered that surprisingly within this part of the waveform, the data holds valuable information about the wellbore geometry. However, since the wave modes arriving can vary significantly and are complex due to several factors affecting the incoming waves, a single algorithm to evaluate the wave modes is not sufficient. Hence, machine learning techniques are used to explore the waveform shapes in detail. These techniques quantify the distance, or difference, between each measured pulse, which allows for the data to be sorted into different groups by means of clustering techniques. This information is then used to distinguish different responses caused by variations in both the geometry behind the casing and the material. Further, a method has been developed that quantifies the behavior within different time intervals of the waveform, and together with the clustering and estimated distance, we differentiate between free pipe where the annulus is thick and filled with fluid, micro annulus, and solid bonding. One key element in the model is a method that recreates the incoming waveforms by applying signal decomposition, summing individual pulses (templates) together to recreate the measured waveform. By using a template (reference) found from a measurement known to correspond to free pipe, signal composition is used to study if the composite signal requires two or more templates to recreate the pulse of interest, obtaining knowledge whether there is interference, i.e., the pulse of interest is actually not just one pulse. Strong interference is a strong indication of micro annulus.

A further feature of the invention is that the processing automatically distinguishes which cluster contains the measurements where the annulus is thick and filled with fluid, referred to as free pipe. Several reference measurements from this cluster are then selected, and the respective difference between the reference measurements and every other measurement in the well are calculated. Assuming a large difference between a specific measurement and the reference measurements is due to solid bonding, a somewhat lower threshold can be applied to pick the measurements most likely to be solid bonding. Furthermore, since the invention, among other attributes, automatically identifies all regions in the annular spacing containing bonding, the shortest path for oil and gas to leak up to the surface can be estimated using an optimization algorithm. Thus, an aspect of the present invention relates to estimating the total height of solid bonding sealing off the annulus of the well.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
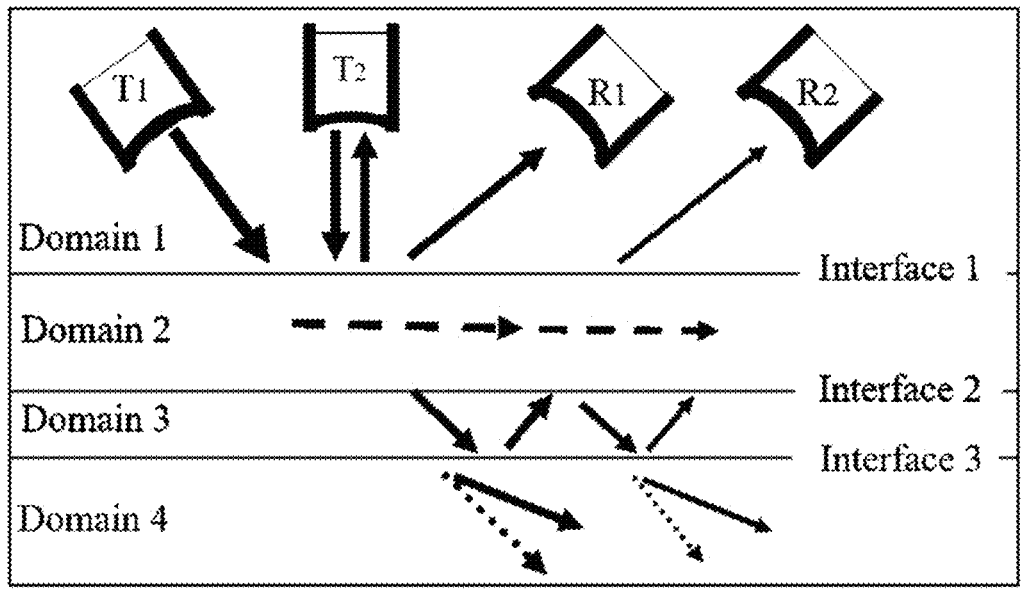
FIG. 1 shows schematically a measuring method and system for characterizing the physical state of a partition installed in a borehole.

FIG. 1 shows schematically a measuring method and system according to an embodiment of the invention for characterizing the physical state of a partition installed in a borehole. The partition is constituted by the wall of a pipe known as a "casing" that is installed in a borehole, thus separating a first domain inside the casing from a second domain outside the casing. The casing is surrounded by solid geological formation, which in the case of an oil or gas well is typically the sea bed. The casing usually comprises multiple sections of progressively narrower bore the deeper they are inserted into the geological formation. After installation of each section of casing, it is cemented inside the borehole so as to form a secure rigid enclosure around the casing, which serves as a conduit for accommodating the drill and releasing the oil or gas through perforations made in the portion of the casing which passes through the production zone, to provide a path for the oil to flow from the surrounding rock into the production tubing. Thus, with reference to FIG. 1 it is possible to define four domains as follows:

Domain 1 is the hollow space inside the casing;

Domain 2 is the wall, which constitutes a partition between the formation and the first domain. In an oil well the partition refers to a casing which is a larger pipe that is assembled and inserted into the recently drilled section of the borehole;

Domain 3 is the annular space between the outer wall of the casing and the formation. If there is no annular space, i.e. the formation is bonded onto the casing, Domain 3 will vanish; and Domain 4 is the geological formation.

We will refer to these four domains as first, second, third and fourth domains, respectively.

At least one transmitter $T_1$ is positioned inside the casing, where the transmitted signal propagates and hits the wall of the casing at an oblique incidence. The transmitted signal excites a guided wave inside the wall of the casing formed of a known material and having a known thickness. From theory, a transducer positioned at an angle inside a liquid-filled pipe can excite guided waves that are similar to Lamb waves. The diameter, $d_c$, and the thickness, $t_c$, of the cylindrical pipe determine the deviation between the guided waves and the Lamb waves. If the ratio $d_c/t_c$ is above 10, which is typically the case in the field, the difference is negligible [1]. The similarity also depends on the frequency, but if the wavelength of the guided wave is much less than the pipe circumference and $d_c/t_c$ is greater than 10, the effect of the curvature becomes insignificant [8].

The transmitter $T_2$ in FIG. 1 is positioned above $T_1$, where the transmitted signal from $T_2$ propagates and hits the wall of the casing at a normal incidence. The transmitted signal excites resonance inside the casing for certain frequencies depending on the thickness and acoustic properties of the casing thereby allowing discrimination between the casing and the casing collars. This measurement method is often referred to as the pulse-echo technique and is described in the reference [3].

Figure 2:
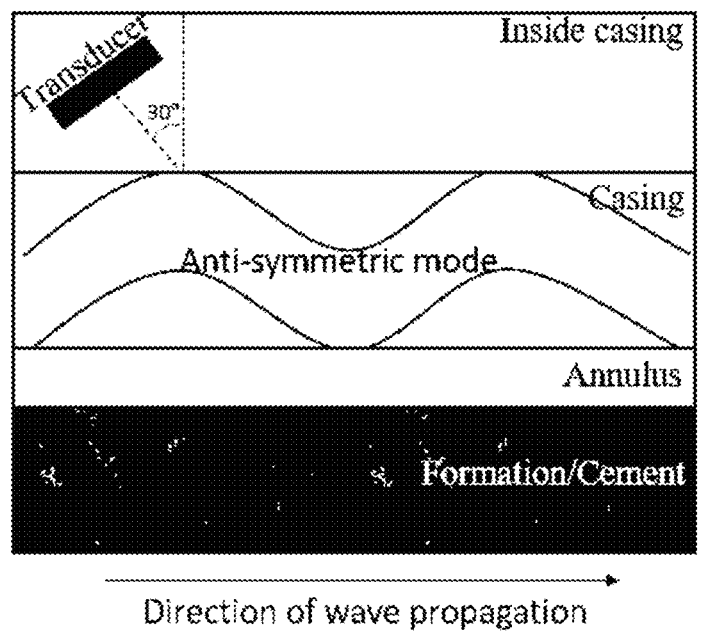
FIG. 2 shows schematically the orientation of the transducer with respect to the partition.

For the transmitter $T_1$, the well geometry can be understood in two-dimensional spatial coordinates, where the length of the partition is the axial direction, and the azimuthal direction is simplified as only one direction. Further, in the frequency regime of interest, the two zero-order modes dominate the propagating wave in the partition. The zero-order symmetric mode ($S_0$) referred to as the extensional wave, has an elliptical particle displacement that is mainly parallel to the casing, i.e. in the axial direction. The displacement of the zero-order antisymmetric mode ($A_0$) has an elliptical particle-motion mainly perpendicular to the partition, i.e. a 'bending' or 'flexural' motion. Thus, the particle motion in the casing is elliptical, with the vertex pointing in the direction of the surrounding material, resulting in waves being emitted from each side of the casing, enabling domain 3 to be investigated. The excitation of $A_0$ at the pipe/plate requires an oblique incidence angle around 30° if domain 1 is filled with water and domain 2 is made of steel. This is illustrated in FIG. 2.

The system also requires at least two receivers, shown in FIG. 1 as $R_1$ and $R_2$, both of which are located in domain 1 and are oriented in mirror symmetry to the transducer relative to a line normal to the outer surface of the casing at an angle of reflection that is equal to the incidence angle of the transducer. The flexural wave leaks off energy as it propagates, and the leaked off pressure wavefront is measured at receivers positioned further up the well. Since the flexural wave leaks energy as it propagates, the wave is being constantly attenuated as the distance increases. The materials on both sides of the casing i.e., in domains 1 and 3 affect the attenuation. Assuming the material inside domain 1 is known, measuring the attenuation from one receiver to the next provides information about the acoustic properties of the material constituting the annular space (domain 3).

Figure 3:
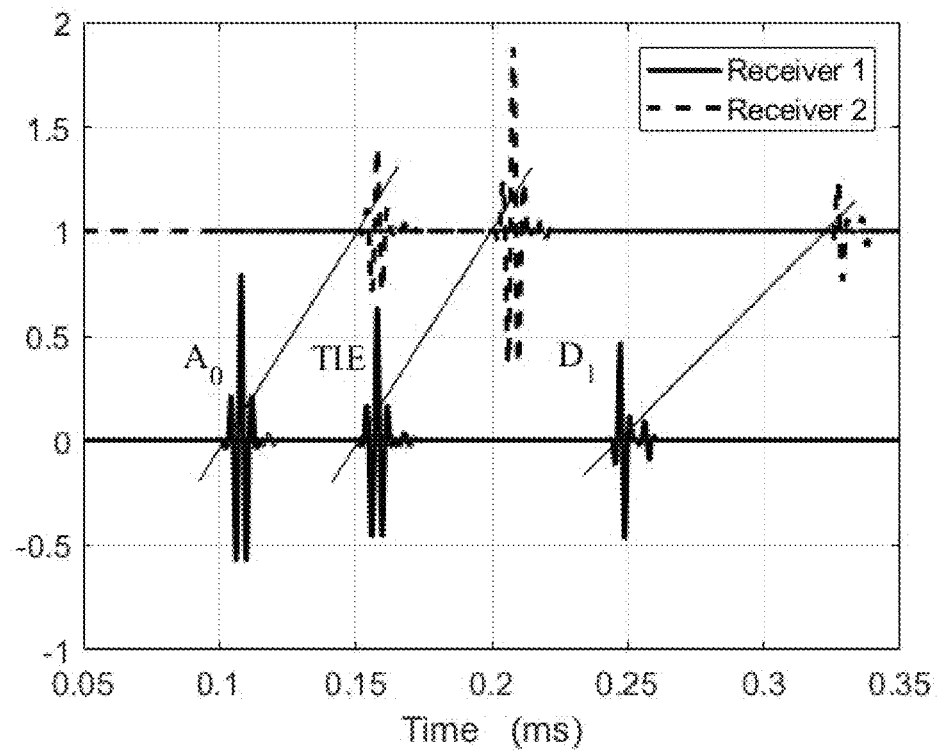
FIG. 3 shows graphically idealized waveforms from ultrasonic pitch-catch measurements with the transducer directed to the partition at an angle of incidence to the normal of approximately 30°.

FIG. 3 shows graphically expected, idealized waveforms from logging in the field and illustrates the effect of a liquid filled annulus (domain 3), where the first waveform is from $R_1$ and the second waveform is from $R_2$, as shown in FIG. 1. The first distinct pulse is the arrival of the emitted wavefront from the flexural wave ($A_0$). In the second waveform one can see the pulse has been attenuated, and the loss between the receivers gives an indication of what type of material is in contact with the casing. The second amplitude seen in the waveforms is a result of the wavefront being reflected back at the interface between domains 3 and 4. This pulse is often referred to as the third interface echo (TIE), where the first interface echo is between domains 1 and 2, and the second interface echo is between domains 2 and 3.

As the flexural wave propagates along the casing, waves are constantly being leaked off, and the waves being reflected at the third interface generate a secondary zero-order flexural wave $A_0$ in the casing, marked as TIE in FIG. 3. Successive waves reflected at the third interface combine to produce a strong cumulative amplitude, and therefore the measured amplitude of the TIE can be larger for the second waveform than for the first as is shown in FIG. 3. The third amplitude is the direct wave ($D_1$), or liquid borne waves, thus travelling slower than the other pulses. This is seen in the figure, where the time difference between the arrivals of the direct wave increases compared to the leaked off wavefront.

However, if the third interface is positioned very close to the second interface, i.e., spaced 100 μm or less, the annulus in domain 3 is referred to as a micro annulus. If domain 3 is this small, the scenario described in the paragraph above is not valid. More of the energy will be transferred directly from domain 2 to domain 4 due to the wavelength of the ultrasonic waves being sufficiently larger than domain 3. Nevertheless, it is believed that some of the energy will be reflected as a TIE, although the TIE will overlap the flexural wave and contain much less energy compared to the situation shown in FIG. 3.

Figure 4:
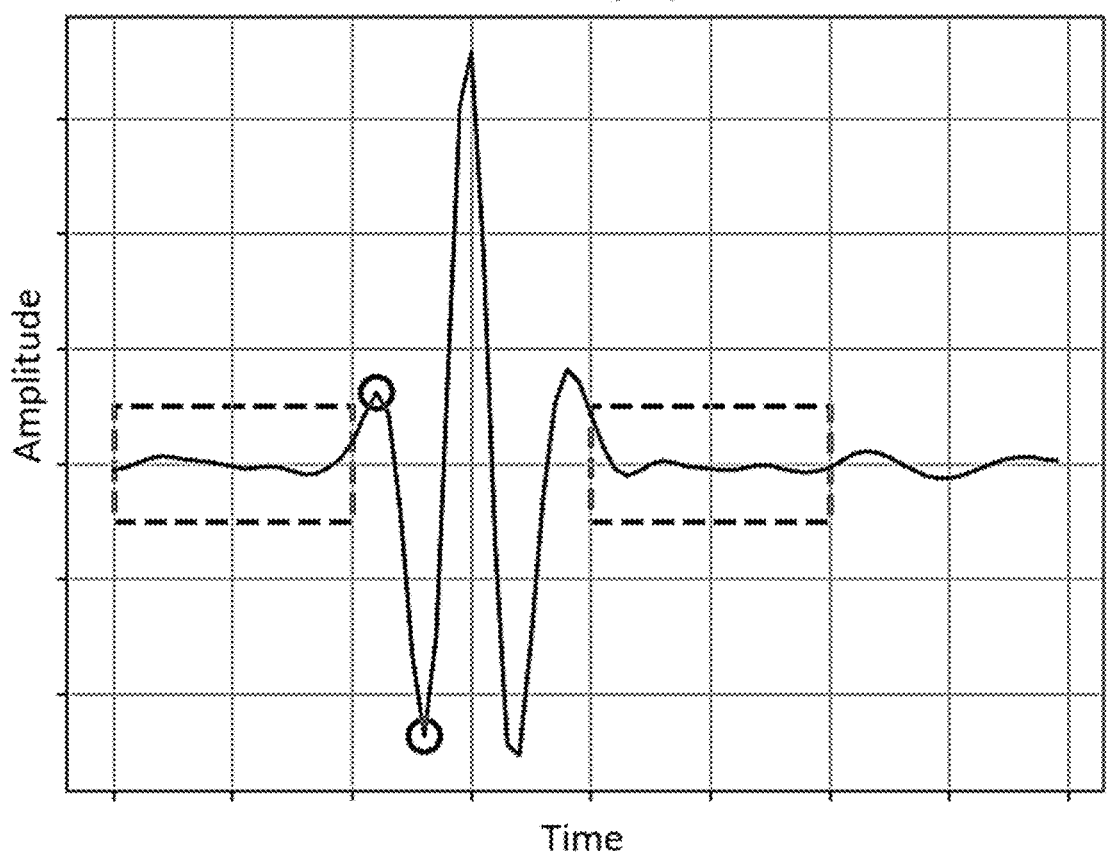
FIG. 4 shows a typical field measurement with fluid behind the partition used as a reference pulse in the preprocessing and illustrates how one can pick a reference that have a smooth Gaussian pulse.

When evaluating the data, some pre-processing is needed, the first step of which is to find a reference pulse such as shown in FIG. 4, represented by a waveform corresponding to fluid behind the partition, wherein the flexural wave should be captured and have a smooth Gaussian shape. Although well-known to those skilled in the art of oil and gas prospecting, we note for the sake of completeness that the casing may extend into the geological formation as far as 10,000 m, while cement is applied only at the bottom of the bore to a depth of 400 m or less. The remaining annulus surrounding the wall of the casing and the geological formation is filled with formation fluid and/or drilling fluid under very high pressure. The invention addresses the need to determine whether there are undesirable fissures in the cement through which gas can escape. During borehole logging, an ultrasonic measuring tool is lowered into the casing and measurements are taken from the upper part of the well where there is fluid behind the partition (the formation can creep and bond on to the casing, but that is less likely) i.e., above the level of the cement. The resulting waveforms are processed as will now be described to obtain the reference pulse, whose lack of smoothness in FIG. 4 is simply the result of the sampling rate being insufficiently high.

To find a reference pulse, all pulses are normalized based on the maximum amplitude pulse. Secondly, only pulses that are representative with respect to amplitude at the two extrema i.e. maximum and minimum marked by circles in FIG. 4 are selected, where "representative" is defined as having an amplitude within an interval close to the median of the values across the whole dataset corresponding to all points of the measured waveform obtained within a logging run. In other words, from the possibly thousands of pulses received, we normalize the pulses and determine the respective amplitudes of the two extrema. We then find the respective median values of the maxima and minima for all these pulses i.e. for the complete dataset and reject all those pulses whose respective maximum and minimum differs from the computed median values by more than a predetermined value. Lastly, out of the remaining representative pulses selected in the previous step, the pulse with the lowest integral of the envelope i.e. under the curve inside the dashed rectangles in the figure is chosen as the reference pulse. It is seen that the two dashed rectangles are located respectively downstream and upstream of the measured extrema i.e. we consider parts of the pulse that occur before and after the extrema. The first dashed rectangle represents a part of the pulse that is known to be unaffected by reflections because it occurs at a time before any reflections could possibly arrive; the second dashed rectangle represents a part of the pulse where a low integral under the curve indicates that there is no arriving reflection within that region since no pulses are detected with any energy.

Figure 5A:
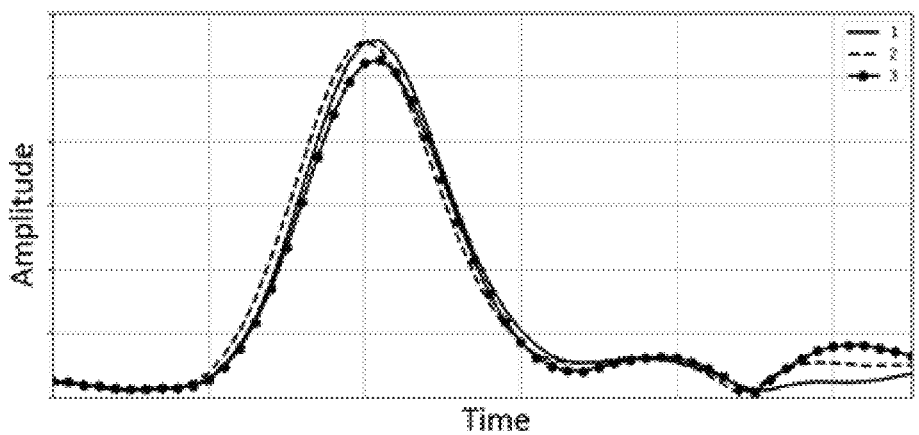
FIGS. 5a and 5b are graphical representations showing the waveform with the flexural pulse without and with time shift, respectively.
Figure 5B:
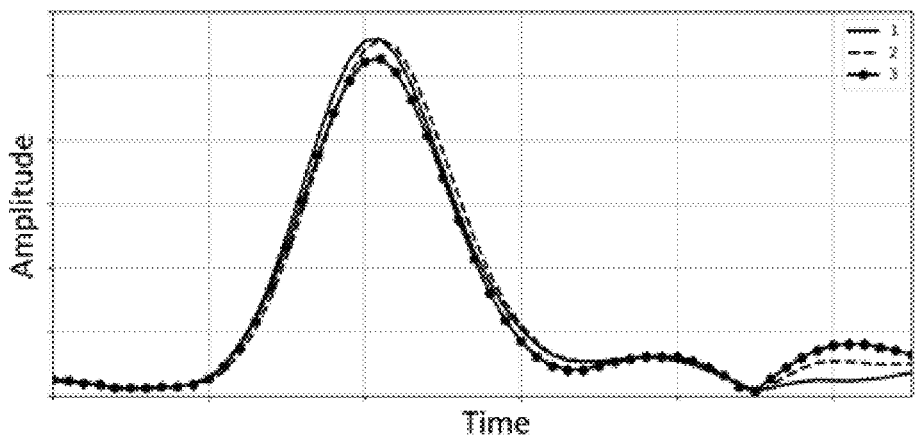

FIG. 5 shows simulated waveforms similar to what is observed from logging in the field and illustrates the small time-shift seen even when the measured reflections are adjusted in such a way that they correspond to the same time of arrival. FIG. 5a shows the envelope of the waveforms without adjusting for time of arrival, where the large-amplitude waves in the plot correspond to the flexural waves. FIG. 5b shows the envelope of the waveforms, where the waveforms have been time shifted so that the flexural waves arrive at the same time. This is done by shifting every measurement by means of cross-correlation with the reference pulse, to find the time shift that renders the best match between measurements and reference pulse. The time shifting of the measurements is typically small for field data; however, even small shifts may affect the result, and may lead to misinterpretation.

Almost all casings and pipelines have connection joints, often referred to as casing collars. The casing collars in this type of application will produce a completely different footprint in the waveforms compared to the rest of measurements. Consequently, it is still necessary to identify them and remove them from the dataset, so they do not interfere with the clustering and lead to misinterpretation. There are several ways to identify the casing collars, where the chosen method in this invention uses the resonance frequency from the $T_2$ measurements. From theory, the casing thickness can be calculated from the acoustic velocity of the casing divided by 2 times the resonance frequency [3]. Since the casing collars are sufficiently thicker than the rest of the casing, one can use the calculated casing thickness and identify and remove all those measurements. The measurements corresponding to casing collars are inserted back into the dataset after the processing is finished as described below.

Figure 6:
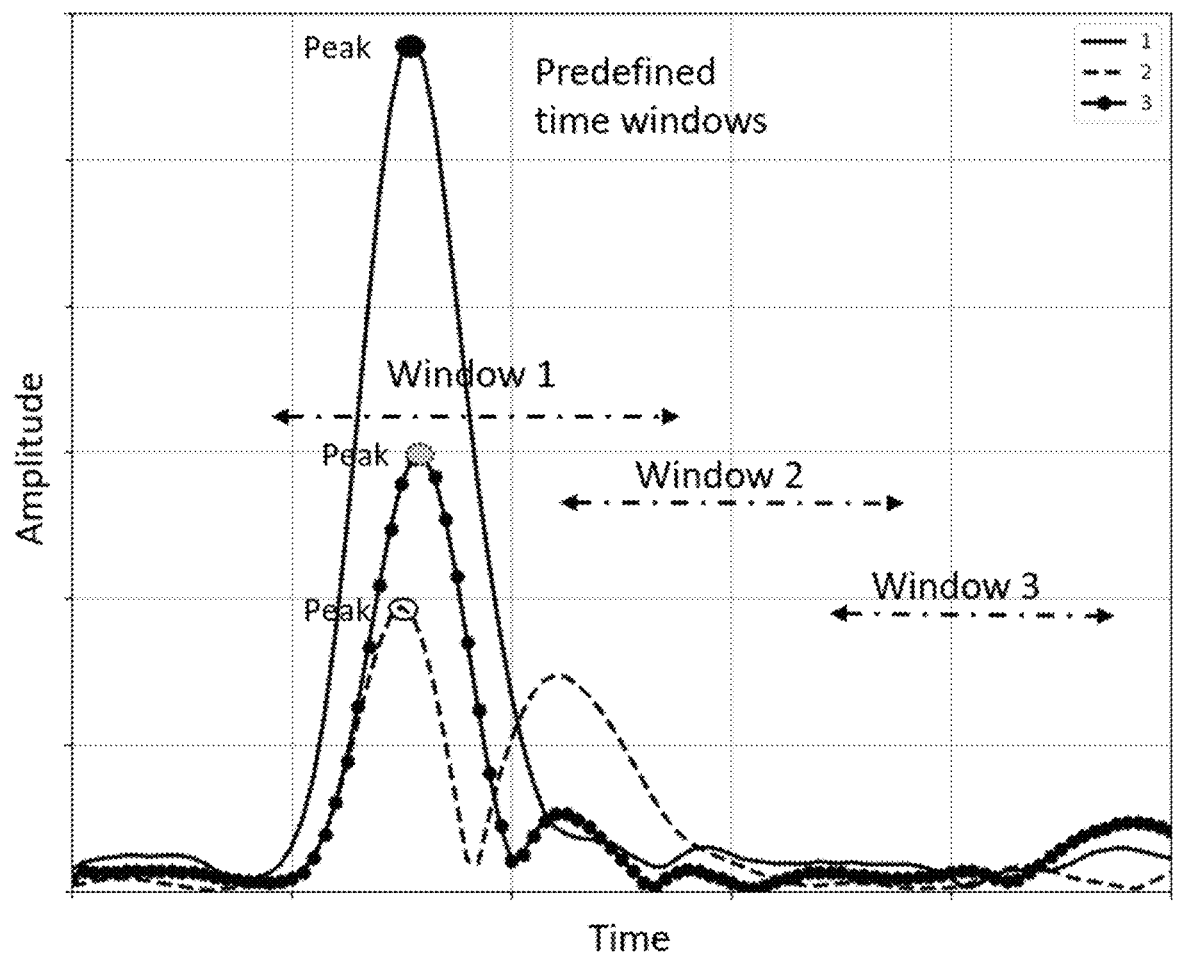
FIG. 6 shows different waveforms depending on the annulus thickness and annulus material with a predefined time window called time-micro-annulus included.

The waveforms in FIG. 5 are idealized and exemplify a response corresponding to fluid on each side of a partition, whereas field data from a whole logging run tend to vary substantially. An example is shown in FIG. 6, where the dashed line (2) corresponds to a solid bonding and the dotted waveform (3) to a micro annulus behind the partition. The solid waveform (1) corresponds to a fluid-filled large annulus. All waveforms are generated by numerical simulations where the geometry and all materials are known. The predefined time windows show the time intervals containing different information about the geometrical condition of domain 3, i.e., if a micro annulus is present or if a solid is bonding. Each time-window is defined as $\Delta t_{n,r}$, where n=1, 2, show the predefined time intervals that are analyzed and $\Delta t_n = [t_{1,r}, t_{2,r}]$ define the closed interval where r=1,2 and specifies if near or far waveform.

The next step in the processing is to group data into different clusters. There are many different types of clustering techniques, such as K-means clustering, hierarchical clustering, distribution-based clustering, density-based clustering, etc. Hierarchical clustering uses a top-to-bottom hierarchy of clusters and performs a decomposition of the data objects based on this hierarchy and has been found particularly well-suited for this type of problem. Two approaches are used based on whether the clusters are formed top-down or bottom-up, called Divisive approach and Agglomerative approach, respectively. For this application, we have focused on the Agglomerative (bottom-up) approach. This approach starts off by considering N datapoints belonging to N clusters. The algorithm then successively groups the data into fewer and fewer clusters, for each hierarchical level. The clustering can then be extracted based on different hierarchical levels, or number of clusters.

Clustering is traditionally not applied on time-series data. However, this technique has proven to be informative for this type of application. One of the reasons for this is the strong footprint in the data. To explore these footprints, cluster analysis is performed on all or parts of the data, for different time windows as seen in FIG. 6.

Figure 7A:
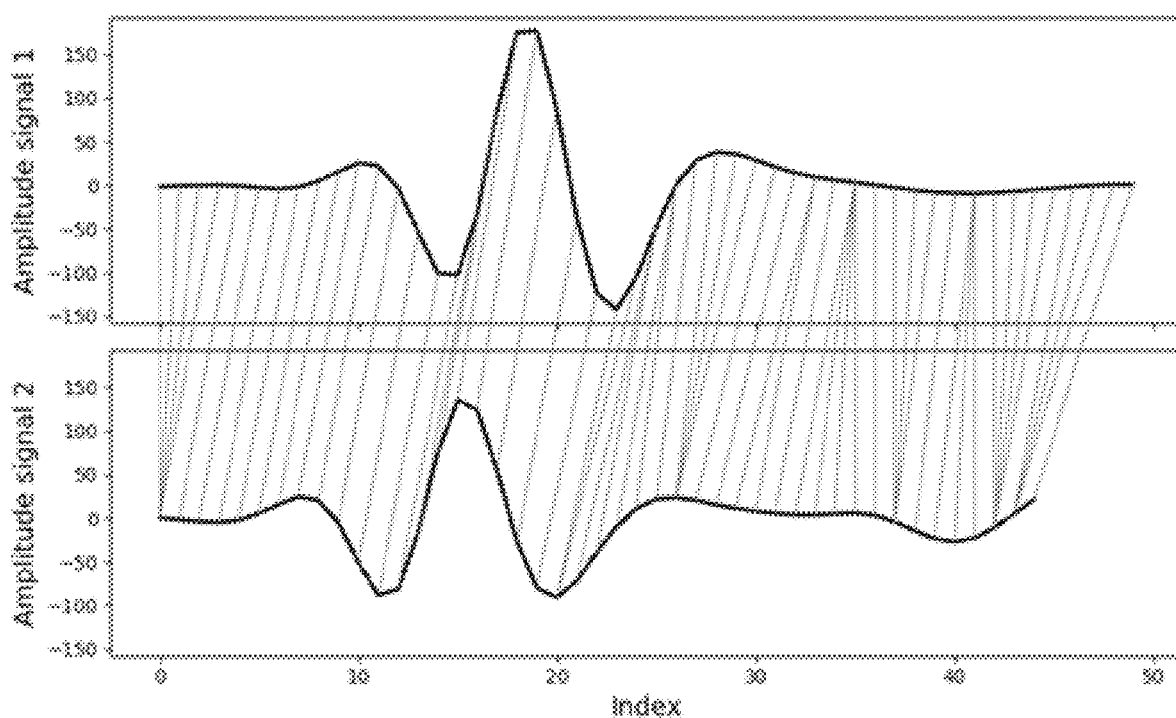
FIGS. 7a and 7b is an illustration of the dynamic time warping technique applied respectively to the invention.
Figure 7B:
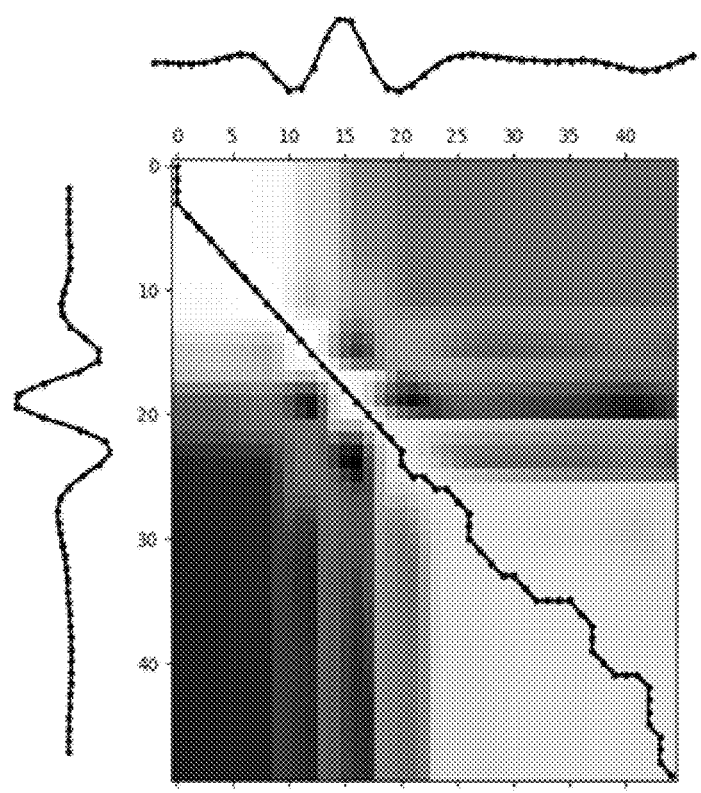

Clustering techniques are used to divide datasets into different groups by means of certain pre-defined distance metrics, where members within a certain group are considered to be more similar or have a closer proximity according to the applied metric. Examples of different metrics used for clustering are Euclidean distance, Hamming distance, correlation, and dynamic time warping (DTW). The choice of metric depends on the type of information to be extracted from the dataset. For this application, a combination of DTW and Euclidean distance has been found to identify important characteristics of the data. One of the main advantages of DTW is the ability to capture similarity between signals that vary in time or speed, making it ideal for analyzing acoustic waveform data. One signal is mapped to another by means of the warping provided in the dynamic time warping algorithm. The time axis of one, or both, of the signals may be shifted in order to achieve better alignment of the signals. To illustrate this, FIG. 7a shows two typical waveforms that have been compared by means of dynamic time warping. The thin grey lines between the two pulses show where the algorithm has found the best match, thereby preserving the phase between the signals. FIG. 7b shows a 2D plot of the distance between the same two signals for all possible paths, giving a mapping of distance (or difference) between the amplitudes for each index in the first pulse (shown to the left), to each index in the second pulse (shown at the top). The black diagonal line shows the best possible path in this case. The pulses are fairly well mapped in this example, except for a time shift, that can be seen in the upper left corner, as a shift of four indices.

The distance measure is then computed based on the best path obtained by the warping algorithm in such a way that the amplitude differences are based on the values of the warped datapoints. In the example in FIGS. 7a and 7b the optimal warping path was used to compute the distance between the amplitudes of two signals. Common distance measures, such as Euclidean distance, would map the amplitude of the first pulse to each index (or time point) directly to the same index of the second pulse. In this example, there is an index (or time-) shift between the signals, that would result in a potentially poor representation of the distance (or similarity) between the signals, if the amplitudes at the same indices were compared without warping.

In a preferred embodiment of the invention, we use DTW as a distance metric in the hierarchical clustering in order to preserve both amplitude and phase information. Thus, each measurement is compared with all other measurements in the dataset, by means of a warped amplitude difference, or distance score, that is used by the clustering algorithm to generate the clusters.

Clustering may be performed in different steps in order to capture characteristics in different stages of the pulse. To this end, the pulse is split into two or three parts, the flexural wave part, and the post-flexural wave part(s). In this way, key characteristics that would otherwise be hidden behind more dominant features in the flexural wave, that are represented by small, but important, variations in the distance metric, may be extracted. Thus, performing different steps of the analysis for different time windows has proven important for successful evaluation of this type of pulse data.

The clustering focuses on the flexural wave part of each pulse, referred to as 'window 1' in FIG. 6. The aim with this first step is to generate the main groups that will form the basis for the following steps in the characterization of the waveforms. For this step, the clustering algorithm is normally set to generate 4 clusters. This is simply because there are two typical scenarios behind the partition, 1) fluid filled large annulus, 2) solid bonding in addition to micro annulus and variations in fluid density or additional bonding, caused for example by shale, which may be represented by the two extra clusters.

Figure 8:
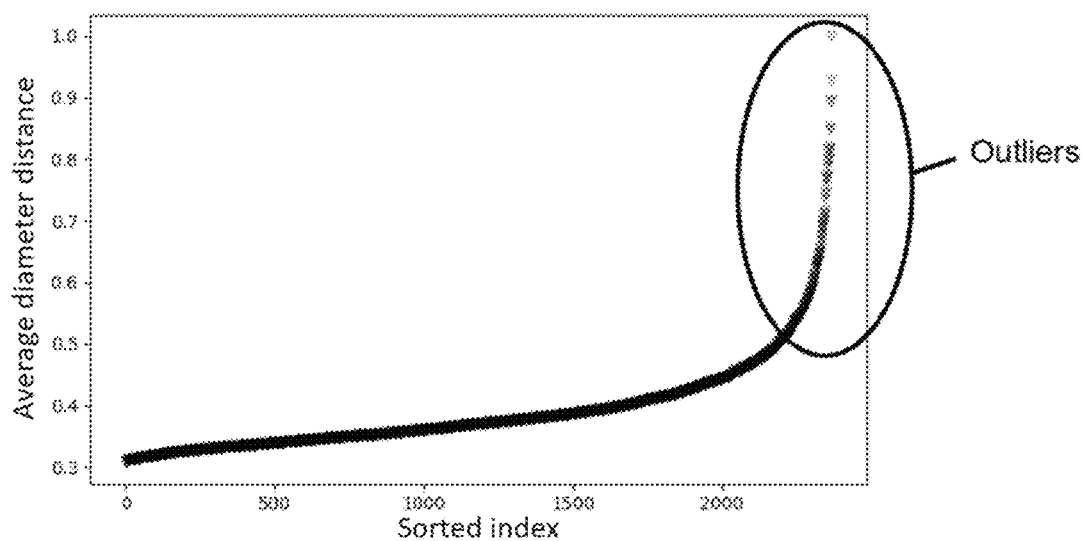
FIG. 8 is a graphical representation showing average diameter to distance for data within a cluster, and detecting the outliers respectively to the invention.

When the measurements are clustered, the next step is to evaluate how representative the members within each group are of their respective clusters, which allows for identification of uncertain members. This is estimated by computing the intra-cluster distances, which represent the respective distance between all members within the same cluster. This distance can be computed in several ways. Here, we have computed the average intra distance between pulses in each cluster using the dynamic time warping distance metric described above, according to:

$$D_i = \frac{1}{(|C_k|-1)} \sum_j \|x_i - x_j\| \quad (1)$$

where $x_i$, $x_{ji} \in C_k$ which corresponds to the average distance between each member $x_i$ in cluster $C_k$, to every other member $x_j$ in cluster $C_k$. The smaller the average distance, the tighter, and more reliable is the cluster. Hence, when computing the average distance, each pulse is given an intra distance score which represents how far the pulse is from the rest of the members in the same cluster. A large intra distance score indicates a non-representative waveform compared to other waveforms in the cluster. FIG. 8 shows the average intra distance for each member in a cluster to all other members in the same cluster. These distances have been normalized so that the maximum value corresponds to 1 and are sorted by increasing distance for clarity. Measurements corresponding to a high average intra distance, indicated by the circle, may correspond to members that potentially do not belong to that cluster. These members may be identified as boundary points bordering on other clusters, or outliers (poor quality measurements). Outliers may be extracted entirely from the dataset while boundary points will be temporarily removed and processed further in the pipeline.

The reason why it is important to consider the intra distance scores for each member in each cluster group is partly to identify the pulses that are uncertain. However, the aim in this step is also to distinguish pulses that have higher post-flexural energy, which is an indicator of reflections coming in towards the later part of the flexural wave. Such pulses may potentially correspond to locations with fluid behind the casing with varying degree of micro-annulus. By making use of the warped distance calculations provided by the DTW, the post flexural activity, which displays large variations in amplitude and phase, can be quantified more accurately. For instance, pulses that have similar waveforms, but that have reflections of comparable amplitude coming in with a slight time shift, will be regarded as similar according to the algorithm, whereas differing amplitudes of the reflections would result in different scores for these pulses.

As noted above, by splitting the pulses into time windows as shown in FIG. 6, we ensure that important waveform characteristics such as secondary reflections with small amplitudes are not hidden behind more dominant high amplitude features of the flexural wave. Therefore, in order to extract information on the post-flexural wave part of the waveforms, we limit the computation of the intra-distance scores in a given cluster to 'Window 2' in FIG. 6, which captures the information just after the flexural wave. Window 2 contains important information about the size of a potential annulus (domain 3) behind the partition as shown in FIG. 1. If domain 3 is thin, the reflection from TIE will arrive early and overlap the flexural wave as discussed previously. By computing the intra-distance scores based on Window 2 we can therefore differentiate pulses that have reflections coinciding with the later part of the flexural wave, even if the reflection has a small amplitude (low energy) or coincides with the later part of the flexural wave. Further, by using the intra-cluster scores, we are able to sort the pulses in each cluster corresponding to a varying degree of post-flexural activity, thereby allowing to extract relevant pulses for further assessment of the potential micro-annulus.

Pulses that deviate from the representative waveforms in each cluster are identified by means of an outlier detection technique (marked as outliers in FIG. 8). These pulses will be evaluated further in the coming steps and will be temporarily extracted from the dataset. Based on the outcome of this evaluation, the pulses will either be considered to represent micro-annulus or will be merged into a suitable cluster as described below.

When the data has been clustered and boundary points removed, the next step in the algorithm is to apply physical parameters to evaluate each cluster, identify the boundary points and merge clusters that represent the same type of information. The final processing is to identify each cluster and use the cluster(s) that present solid bonding to calculate the shortest path for oil and gas to migrate behind the partition and up through the surface.

Figure 9:
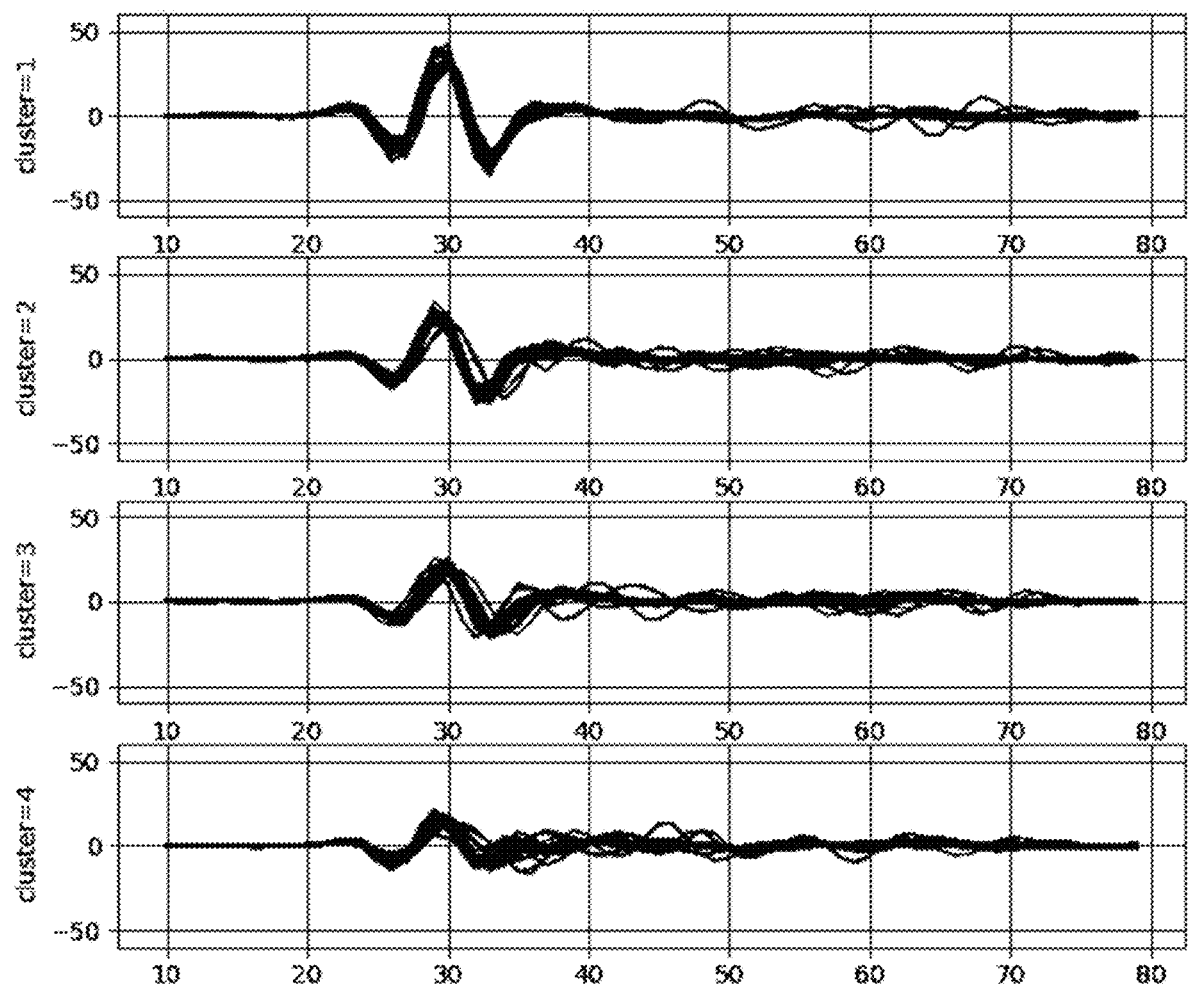
FIG. 9 shows different waveforms from each cluster, where the difference between the clusters depends on the annulus thickness and annulus material.

FIG. 9 shows typical waveforms picked from four clusters, the waveforms being representative of the data within each respective cluster since boundary points were extracted in the previous step. It can be seen that the waveforms for each cluster are similar, i.e., are of similar amplitude and shape.

Once the pulses have been sorted into clusters, each group can be categorized as to what material is behind the partition as well as the size of domain 3. To do this, three different physical well-known parameters are used to identify which cluster represents free pipe and which cluster represents solid bonding, where for each parameter target-specific information is generated based on the scenario behind the partition.

The first physical parameter evaluates the peak maximum amplitude of the flexural wave, where one can apply a standardized algorithm that picks the largest value within a vector (found in most coding-languages). The second parameter is similar to the flexural attenuation [5], but instead of just dividing the peak amplitude from the far receiver by the peak amplitude from the near receiver, one can calculate the integral envelope attenuation within a predefined time-window. The integral can be estimated by the equation below, where $A_{e,n}$ is the envelope of the waveform and $[t_{n,1}\ t_{n,2}]$ defines the closed interval where n=1,2 and specifies which waveform:

$$A_{e,n} = \int_{t_{n,1}}^{t_{n,2}} S_{e,n}(t)dt \quad (2)$$

Figure 10A:
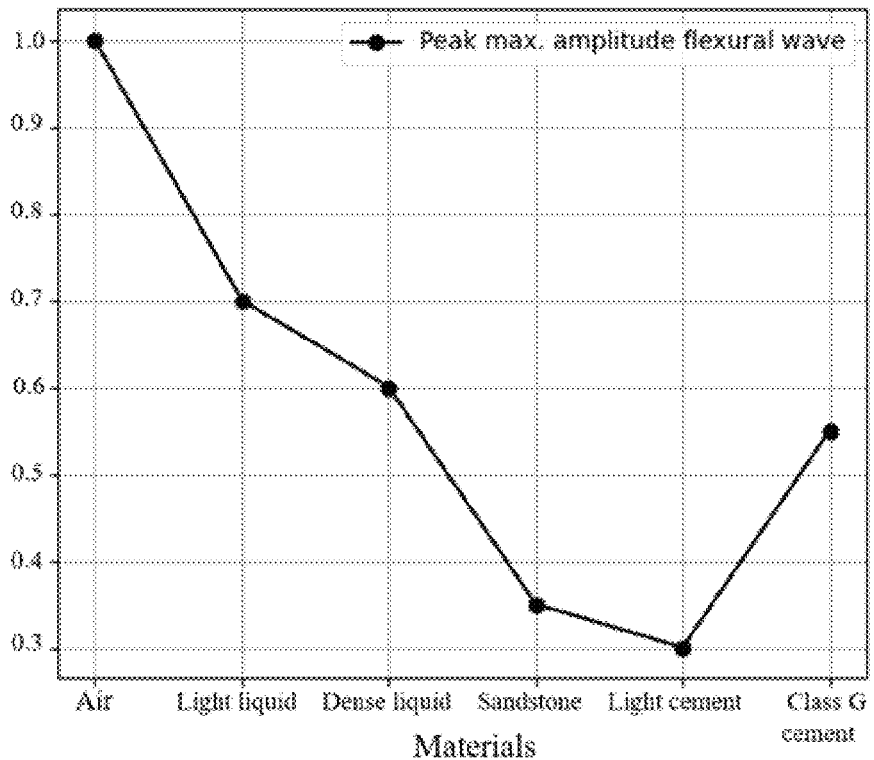
FIGS. 10a and 10b illustrate the dependency of normalized peak amplitude of the flexural wave and normalized sum flexural attenuation, respectively, on the material behind the partition.
Figure 10B:
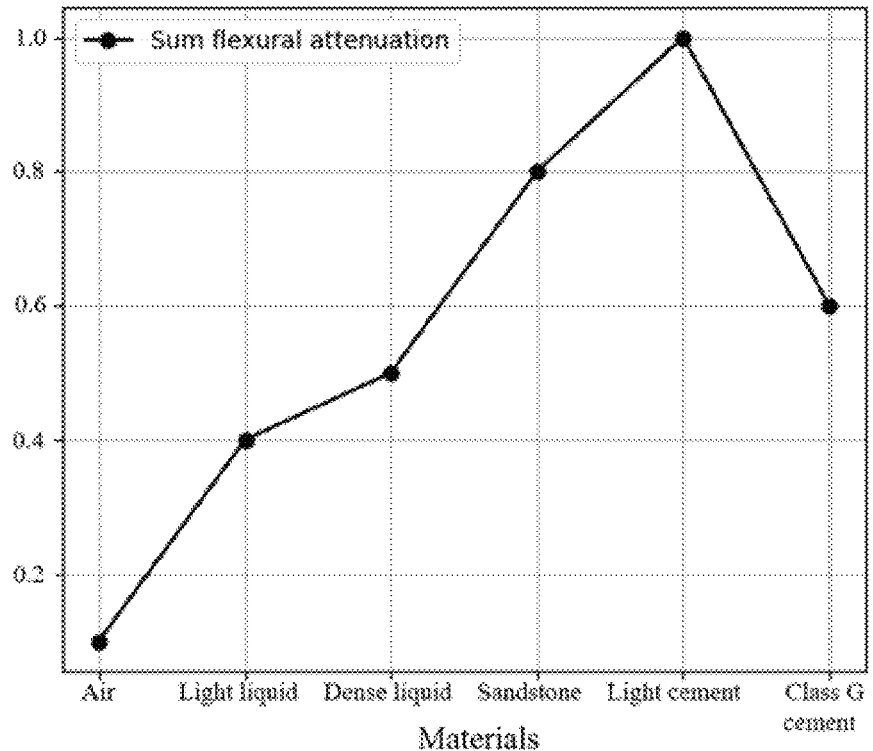

Then the integral attenuation ($\alpha$) is found as given below:

$$\alpha = \left(\frac{A_{e,2}}{A_{e,1}}\right) \quad (3)$$

where equation (3) can be then used to estimate the loss in energy within a predefined time-window between the two waveforms. FIG. 10 shows the normalized peak amplitude (maximum) value for different materials behind the partition and the integral attenuation of the flexural wave for different materials. Both physical parameters have been normalized so the maximum value within the dataset is equal to 1.0. If the material behind the partition consists of fluid, the response produces a high maximum peak and low integral attenuation. Conversely, if the material behind the partition consists of formation or light cement bonding, the result is the opposite where the response is a low maximum peak and high attenuation. It is seen in FIG. 9 that cluster 1 has a high peak amplitude for the flexural wave, while cluster 4 has a low peak. This already gives an indication that cluster 1 denotes fluid behind the partition while cluster 4 denotes solid bonding behind the partition.

Figure 11:
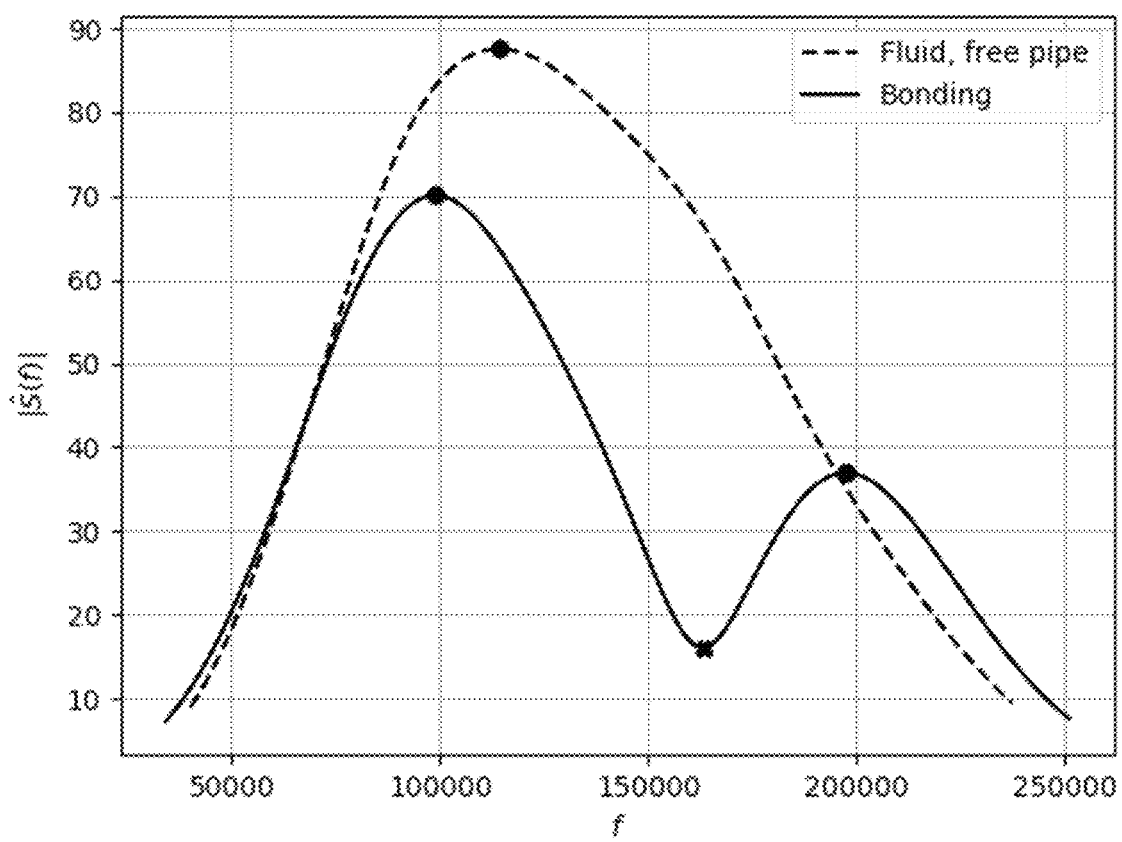
FIG. 11 shows the absolute frequency spectrum plotted against the frequency for fluid and solid behind the partition, and demonstrates how one can differentiate the responses.

The third parameter is derived by extracting information available in the flexural wave that is only visible if a solid material is bonding to the partition, wherein the velocity of the compressional wave in the annulus needs to overlap the dispersive phase velocity of the flexural wave. This physical phenomenon, often referred to as a perturbation within the flexural wave, is explained in [3, 8, 11]. One aspect of the present invention is to provide a stable and functional algorithm to detect if such a perturbation is present. The principle by which the algorithm works may be demonstrated by plotting the amplitude against frequency in FIG. 11, where the solid line corresponds to a solid bonding to the partition and the dashed line corresponds to fluid behind. A point on the casing is considered bonded if a minimum having zero gradient is observed in the absolute value of the frequency spectrum for the measured waveform. To determine if such dip is present the number of local extrema is counted. If the number of local extrema is larger than or equal to 3, then there must be at least one dip present. In addition, the second extremum found is assumed to be located at the perturbation frequency [3, 8, 11]. The figure shows the absolute value of the spectrum for a fluid in domain 3 (free pipe) and a bonding measurement. In the free pipe measurement, the algorithm only finds a single extremum and thus concludes that this this measurement is free pipe. In contrast, for the bonding measurement the algorithm detects three extrema and chooses the second one to be the bonding frequency.

Figure 12A:
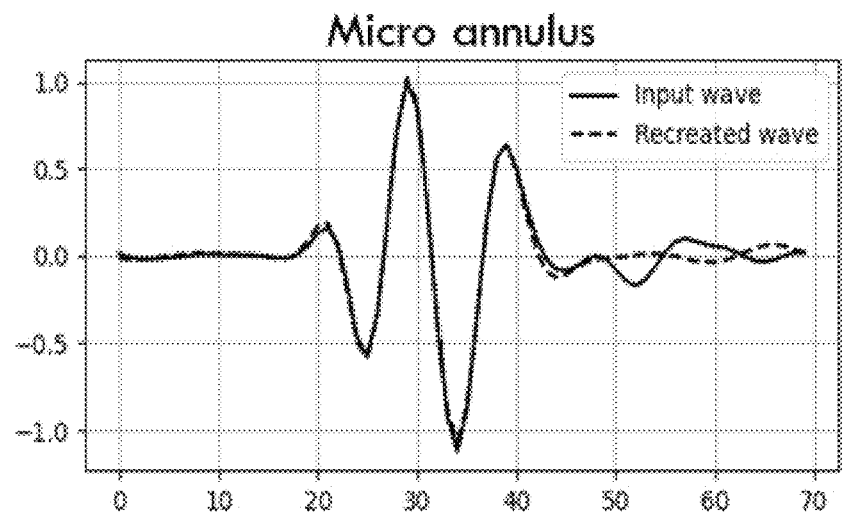
FIGS. 12a to 12c show respectively input waves, recreated waves and thresholds relating to reflections where there is a micro annulus behind the partition and the recreated wave is computed by applying signal decomposition according to the invention.
Figure 12B:
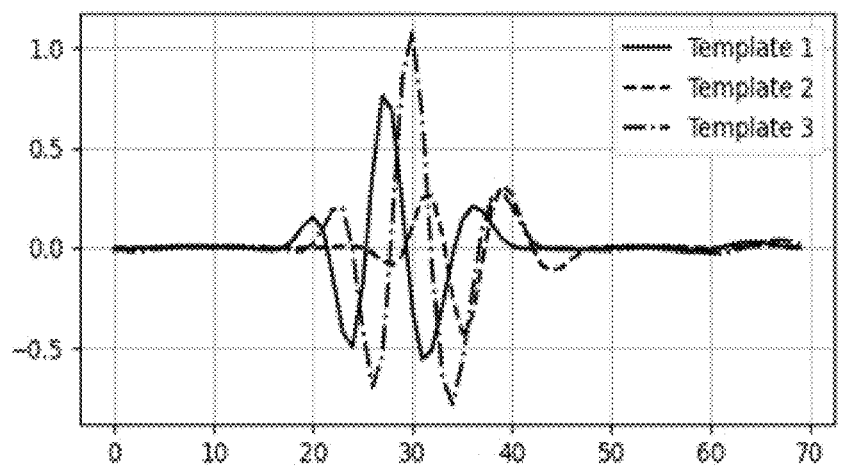
Figure 12C:
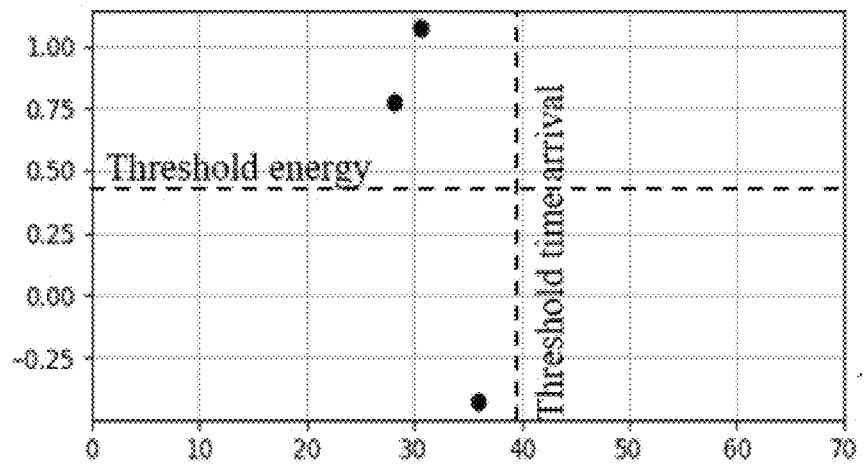
Figure 12D:
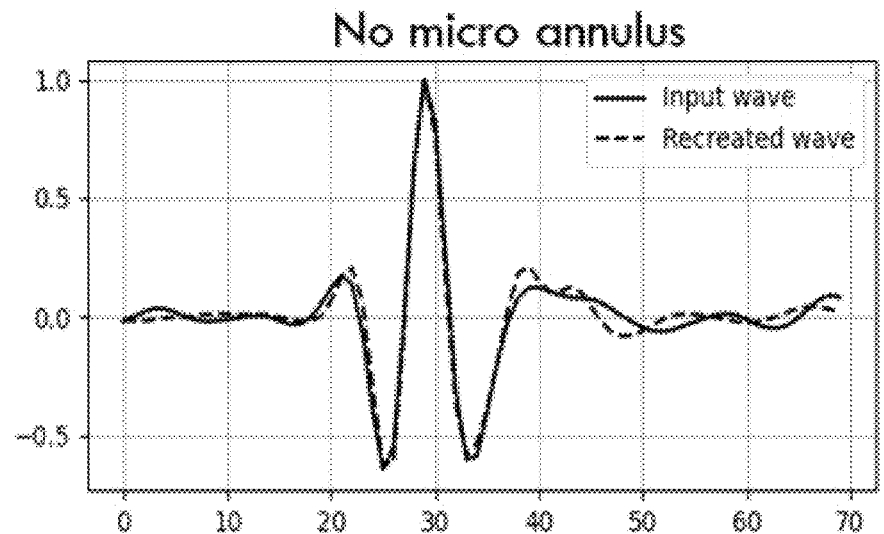
FIGS. 12d to 12f show respectively input waves, recreated waves and thresholds relating to reflections where there is no micro annulus behind the partition and the recreated wave is computed by applying signal decomposition according to the invention.
Figure 12E:
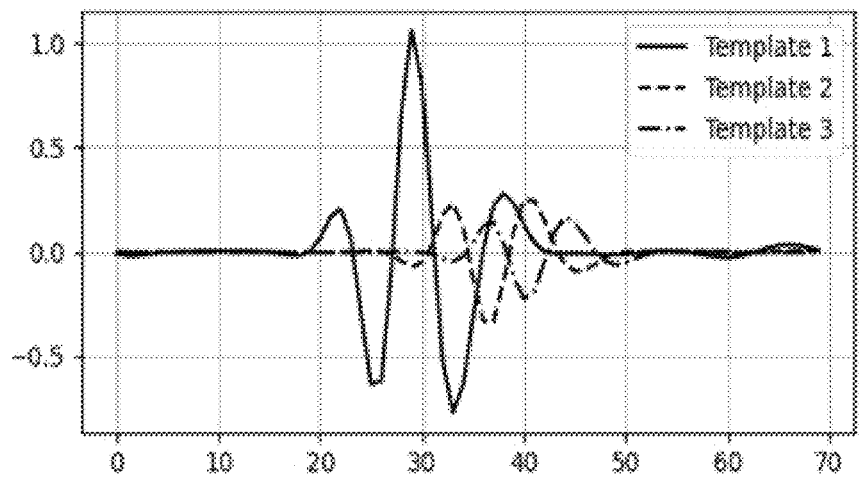
Figure 12F:
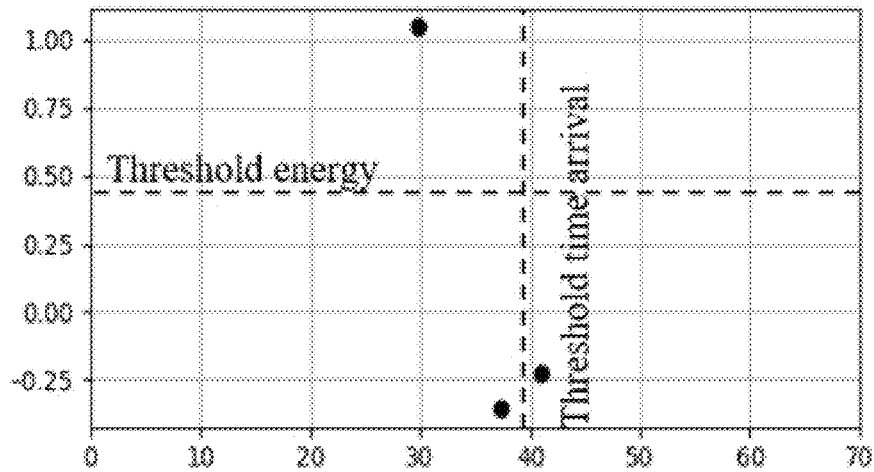

The next step is to evaluate all boundary points that have been removed from their respective cluster. This is done by applying signal decomposition, i.e. separation of single components from a composite waveform, where the composite waveform consists of a sample-wise superposition from multiple pulses. To recreate the composite waveform, a template pulse is required, and the number of templates used to recreate the measurement will vary depending on the application. According to one embodiment of the invention, the template is set as the reference pulse estimated as presented in FIG. 4 corresponding to fluid behind the partition. Since the interesting part within the waveform is the flexural pulse and the reflection behind, in addition to potential interference between those pulses, the number of templates is set to three. In some cases, two templates would be enough, although it has been observed in other cases that two templates are insufficient and provide a misleading result. In FIGS. 12a and 12d, one can see the boundary point (measurement) represented as the input wave in solid line and the recreated wave in dashed line which is the sum of the three template pulses, both plots showing amplitude vs time (in μs). Here, the plot in FIG. 12a is from a measurement interpreted as micro annulus and the plot in FIG. 12d is interpreted as not being a micro annulus. FIGS. 12b and 12e show the template pulses separated, where each pulse is scaled, i.e., time-shifted by stretching or compacting and modified in amplitude, relative to the reference template. In FIG. 12e it can be seen that the first strong pulse nearly matches the input wave, and this will occur if no strong separate reflection or a strong early reflection interferes with the flexural wave. This is opposite for the plot in FIG. 12b, where there are two dominant template pulses needed to recreate the measurement. This indicates that the flexural wave is mixed with another pulse, i.e., a reflection from micro annulus. FIGS. 12c and 12f show the peak maximum of each template pulse and the time of arrival of the peak. If the time of arrival of the peak arrives later than a predefined threshold, the template pulse is not considered micro annulus. In addition, if the peak maximum has less energy than a predefined threshold, the template pulse is considered noise or uninteresting external factor. This is demonstrated in FIGS. 12c and 12f where only signals above the threshold energy and earlier than the threshold arrival time are evaluated.

In addition to signal decomposition, an independent evaluation is conducted using DTW perturbation analysis. For this analysis, we make use of the warped distance calculations between a template pulse (s1) and a pulse to be analyzed (s2). The template pulse is once again carefully selected to represent the flexural waveform characteristics without any secondary reflections. Once the template has been selected, it is scaled to the maximum amplitude of s2. The resulting distance between the two signals represents the difference between the waveforms of s1 and s2. Further, by using the warped distance calculation using the optimal path from the DTW algorithm allows for a more accurate assessment of the difference in shape of the waveforms, rather than simply taking the difference between the signals.

The resulting DTW distance between s1 and s2 represents the perturbed signal, with the contribution from the flexural wave removed. Therefore, it will contain information about possible reflections coming in after, or coinciding with, the flexural wave. By evaluating the peaks and amplitudes of this perturbed signal, we can estimate the time of arrival of the reflections, as well as assess the energy content. By using the time of arrival threshold described above for the waveform decomposition technique, we can identify pulses that have reflections arriving within the threshold time as potential micro-annulus.

It is worth noting that any reflections coinciding with the flexural wave, may not be accurately assessed with the DTW perturbation analysis, since reflection waveforms may act constructively or destructively on the original flexural waveform shape. In this case the decomposition method described above will be more accurate. But in the perturbation analysis, our focus is to identify, not quantify, the micro-annulus. Any deviations from the template flexural waveform will be extracted. Hence, it is a stable method that is used to complement the decomposition method.

All measurements considered to be boundary points, i.e., having a high intra-distance score for the post-flexural wave part, will be analyzed by applying the signal decomposition and DTW perturbation analysis methods. The measurements that are not identified as micro annulus need to be merged back to the dataset. Since these measurements are considered to be uncertain, they are evaluated again, partly in order to see if they should belong to another cluster, and partly to give an assessment of how well they fit in to their final cluster.

The uncertain datapoints are merged into clusters by comparing the inter distance scores $D_{ik}$ for each datapoint to every other cluster. The inter distance score is defined as the average distance from each member $x_i$, in cluster $C_i$, to all other members $x_j$ in the other clusters $C_k$ where $k \neq i$ according to:

$$D_{ik} = \frac{1}{(|C_k|)} \sum_i \sum_{ij} \|x_i - x_j\| \tag{4}$$

The cluster that corresponds to the minimum inter score that gives the minimum average distance, is selected as the appropriate cluster for each boundary point.

Once the uncertain data points have been merged into new clusters, we assess how well they fit in to their respective clusters. This is done by calculating the Silhouette coefficient for all of the uncertain datapoints. The Silhouette coefficient is a metric that is used to assess how good a clustering is, by comparing how similar each member is to its respective cluster compared to its distance, or separation, from all other clusters. The Silhouette coefficient is computed for each boundary point i in cluster $C_i$, according to:

$$s_i = \left(\frac{b_i - a_i}{\max\{a_i, b_i\}}\right), \text{ if } |C_i| > 1 \tag{5}$$

where $a_i$ is the average intra distance from each member i to all other members in the same cluster $C_i$, and $b_i$ corresponds to the minimum of the average inter distance scores $D_r$ from each member $x_i$ to all members in different clusters, as defined according to:

$$D_r = \frac{1}{(|C_i| - 1)} \sum_i \sum_{ij} \|x_i - x_j\| \tag{6}$$

In principle, Silhouette scores range between −1 to 1, where values close to 1 indicate that the member is well matched to its own cluster and well separated from other clusters, while low scores indicate that the members are not suitably clustered. Negative values of the Silhouette score indicate that there is another cluster that is closer to that member. However, since the data points have already been merged into the most appropriate cluster as determined by the minimum inter scores, the Silhouette scores will actually range between 0 to 1. These scores give a measure of how well matched the pulses are to their respective clusters, and ultimately, allow for a quantification of the uncertainty of the final interpretation of the material behind the casing.

Figure 13:
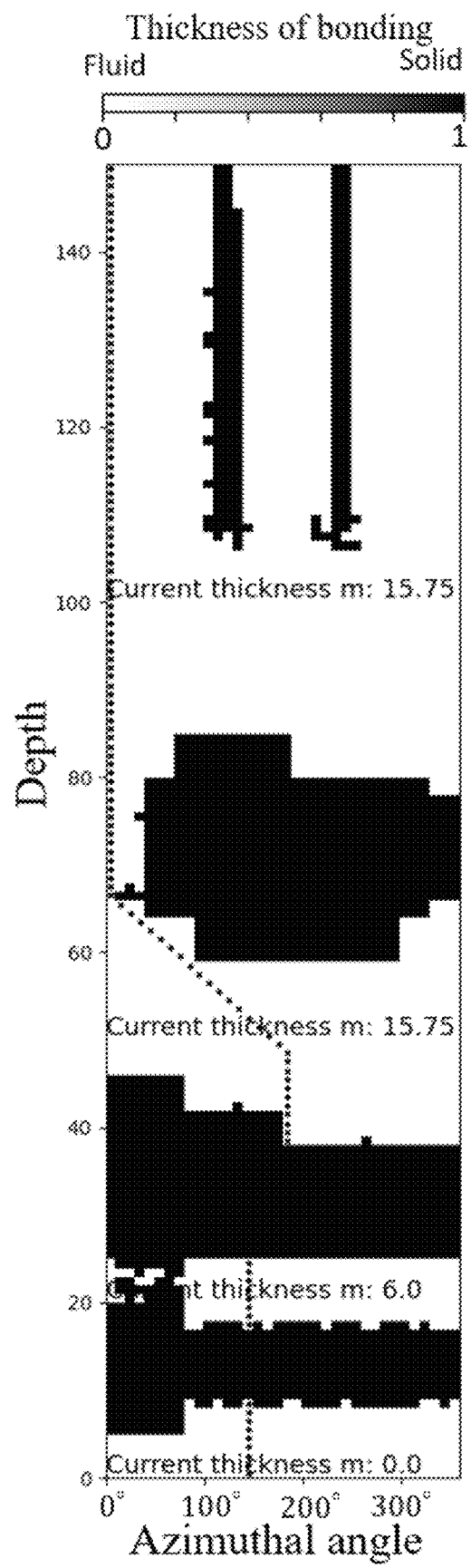
FIG. 13 shows a petrophysical log displaying the estimated bonding according to the invention in black, and a combinatorial algorithm displayed as a dotted path used to calculate the total meters of solid bonding according to the invention.

When the clusters have been identified, the boundary points evaluated and the uncertain data merged and given an uncertainty score, the measurements containing casing collars are merged together with the dataset. These measurements will form their own separate cluster but are not of any further interest for this invention other than to allow their removal prior to analysis of the core data to avoid misinterpretation while allowing them to be re-inserted at their respective spatial positions in the final plot and avoid gaps in the final picture. Once the final clusters are defined, one can provide an answer to the material and geometry behind the partition. This is typically delivered as a 2-dimensional color plot, where the y-axis displays the depth in the well and the x-axis displays the azimuthal direction. Since clustering of data provide each measurement with a single value, the depth inwards in the borehole wall are removed and the time series is substituted with a value representative to its respective cluster. The two-dimensional array unwraps the surface to form a 2-D planar array, where the 2-D array maps depth vs azimuthal angle so that each row of the array maps to a point on the partition wall of the casing at a given depth. The value for each datapoint in the array is a description of the material and/or the geometrical structure behind the partition. The large fluid-filled annulus cluster is given the value 1, the micro annulus cluster is given the value 2 and the bonding cluster is given the value 3, except the uncertain data in each cluster, which will be assigned a unique score given from the Silhouette coefficient. As mentioned above, an uncertain data point is given a score that varies between 0-1. So for example for the bonding cluster, an uncertain score is above 2 and below 3, where just above 2 is a weak indication of bonding and just below 3 is a strong indication of bonding, In a further aspect of the invention, the cluster identified as solid bonding is used to calculate automatically how many meters of isolation the solid bonding provides in the well. The data belonging to the bonding cluster is now set to 1, where the remaining data are set to a zero. By way of example, a 2-dimensional matrix filled with 0's and 1's was created. 1 represents bonding or extremely small micro annulus while 0 represents fluid and/or thick annulus. The size of the matrix is 150 times 36, where 150 is the depth and 36 is the number of measurements around the complete azimuth of the pipe. The size of the matrix was chosen arbitrarily for illustrative purposes. FIG. 13 shows a petrophysical log plotting the matrix, where the y-axis is the length of the pipe while the x-axis shows the angular displacement around the pipe relative to a known azimuth.

Further, to estimate the shortest path for oil and gas to leak up to the surface, an optimization algorithm has been developed based on the principle of dynamic programming. The optimization algorithm receives as input an array with size (M, N), indicating if each cell is either fluid (0) or solid (1). The value of the cell at row i and column j is defined as s(i, j). The algorithm starts at the bottom of the array (i=1) and moves upward, increasing i for each step. Due to the structure of the problem, two searches are performed at each row, first from left to right in the array (j=0, 1, ..., N), and then from right to left (j=N, N−1, ..., 0) and the minimum of these two searches is employed for each entry. The length of the shortest path from the bottom of the array (row 1) to the cell at (i,j), defined as f(i,j), can be formulated as $$f(i, j) = \min_{a,b} f(a, b) + s(i, j) \quad (7)$$

where $(a,b) \in \{(i,j-1),(i-1,j-1),(i-1,j),(i-1,j+1)\}$ when moving from left to right, and $(a,b) \in \{(i,j+1),(i-1,j-1),(i-1,j),(i-1,j+1)\}$ when moving from right to left. In this way the shortest path solutions can be built up by moving iteratively through the array from the first row and up.

The ultrasonic measuring tool is moved in a clockwise helical path through the pipe, with the entries in each row of the array representing one rotation in the helical path. Thus, the first and last columns in the array represent a rotation angle of 0 and 350 degrees respectively. Furthermore, seeing as each row consists of one rotation with the tool, the first and last column in the array are physically adjacent. Consequently, at the edges of each row one should use the values from the other end of the row as neighboring entries. The two entities represented by the last entry in one row and the first entry in the next row are therefore next to each other in the casing, as 360 degrees and 0 degrees rotation is the same. Therefore, at the start of each row one should use the value at the end of the previous row as the neighboring entry to the left, and at the end of the row one should use the value at the start of the next row as the neighboring entry to the right.

After the algorithm has run through the whole array, each array entry describes the length of the shortest path to this entry from the bottom of the array. To find the shortest path through the dataset, as plotted in FIG. 13, the algorithm starts at the smallest value in the top row and follows the adjacent array entry with the smallest value either across or down throughout the array until it reaches the bottom.

Figure 14:
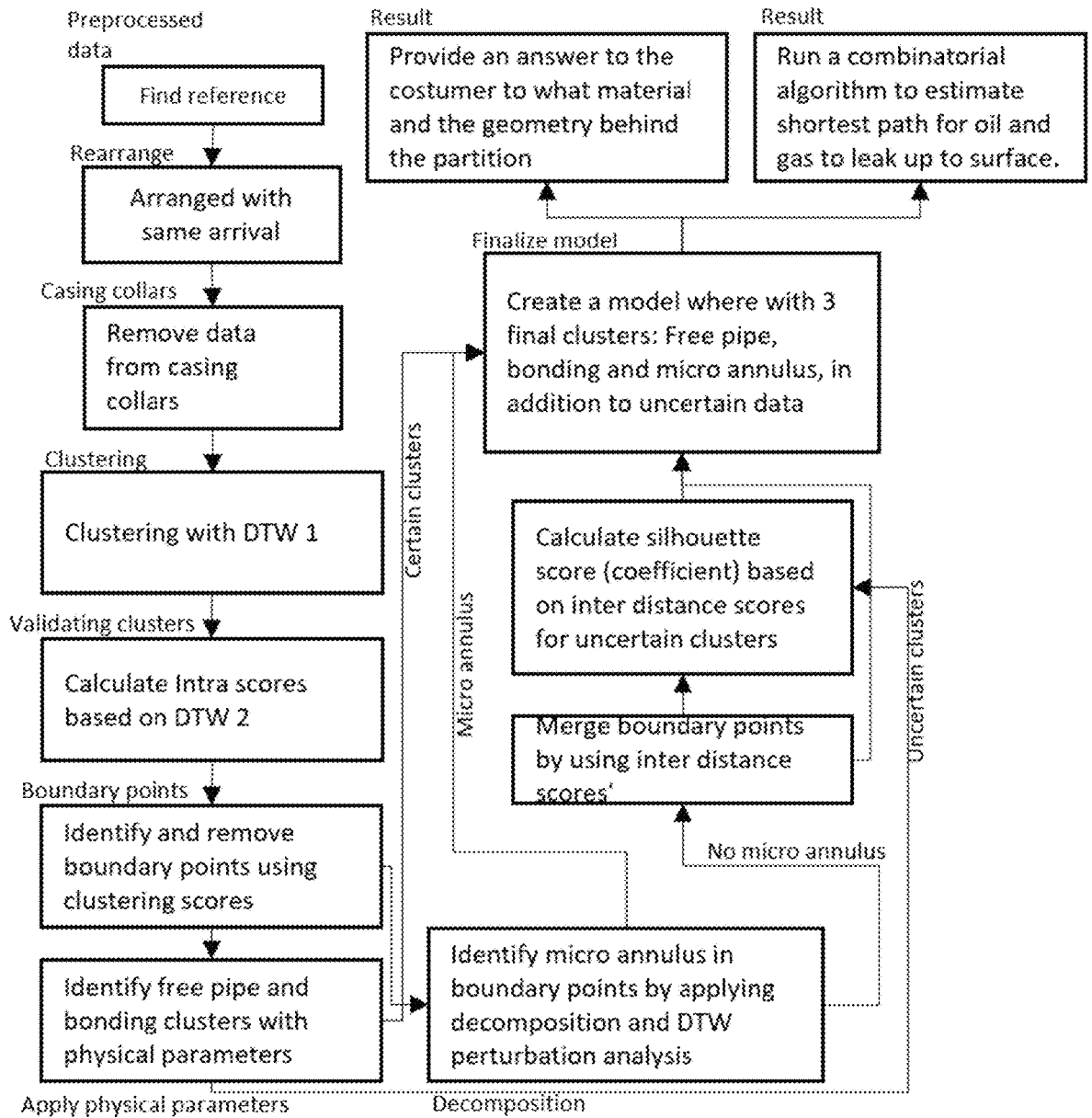
FIG. 14 is a generic flowchart showing the principal processing operations according to the invention to cluster data, automatically identify each cluster, and estimate the total length of bonding.

FIG. 14 shows an overview of the complete processing chain, where the first step is to find a reference measurement and use that to arrange all measurements with same time of arrival for the flexural waves. Then the casing collars are removed from the dataset and the remaining measurements are clustered using DTW Window 1. After the measurements have been clustered, all data within each cluster is evaluated using intra distance scores based on DTW Window 2, where measurements with a high intra distance score (boundary points) are removed and analyzed for potential micro annulus. The remaining data are sorted into four clusters, and the next step is to automatically identify the two clusters that represent large fluid-filled annulus and bonding, respectively. The two identified clusters form the basis of two of the final clusters to which measurements from the other two clusters may subsequently be transferred. The two remaining unidentified clusters will be evaluated later, but first all boundary points are analyzed by applying signal decomposition and DTW perturbation analysis. The boundary points concluded to be micro annulus make up the third and final cluster, where the boundary points not concluded to micro annulus, are merged each into its matching cluster by using inter distance scores. If the boundary points are merged with one of the identified clusters, the measurements become part of the final clusters, although an uncertainty score calculated from the silhouette coefficient may be given if desired. The merged boundary points in the uncertain clusters, and every other measurement in those respective clusters, are then analyzed using silhouette coefficients. From the analysis, the measurements are merged into either the large fluid filled annulus or bonding cluster. Again, an uncertainty score may be given if required. From the three final clusters, in accordance with an aspect of the invention, the material and the geometry behind the partition may be established. In addition, the optimization algorithm calculates the shortest path for oil and gas to leak up to the surface.

It should be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

It will also be understood that the method according to the invention may be implemented using a computer program. The invention further contemplates a machine-readable memory tangibly embodying a program of instructions executable by the machine for executing the method of the invention.

The invention claimed is:

1. A method for determining material properties between a wellbore and a casing, said casing having a wall forming a partition that separates a first domain inside the casing from a second domain outside the casing, the method comprising:

disposing at least one ultrasonic transmitter and a plurality of ultrasonic receivers in longitudinally spaced-apart relationship along a first side of the partition in the first domain;

activating the at least one ultrasonic transmitter to form ultrasonic waveforms that comprise propagated quasi leaky-Lamb waves constituting flexural waves having symmetric and antisymmetric zero-order modes within the partition;

receiving and recording the ultrasonic waveforms at the spaced-apart receivers;

applying a time-shift to the recorded ultrasonic waveforms so that the respective time-shifted waveforms corresponding to each of the flexural waves arrive at the same time;

clustering the time-shifted waveforms to form separate clusters respectively relating to a flexural wave part, and at least one post-flexural wave part which exposes characteristics that would otherwise be hidden behind more dominant features in the flexural wave; and using said characteristics to establish a material and geometry behind the partition.

2. The method according to claim 1, wherein said characteristics include variations in pre-defined distance metrics, where members within each cluster are considered to be more similar or have a closer proximity according to the applied metric.

3. The method according to claim 1, wherein applying a time-shift includes:

determining a reference pulse corresponding to the flexural waveform without any secondary reflections and obtained from fluid behind the partition, said reference pulse being represented by a flexural wave having a smooth Gaussian shape; and shifting the recorded ultrasonic waveforms by means of cross-correlation with the reference pulse, to find the time shift that renders a best match between the recorded ultrasonic waveforms and the reference pulse.

4. The method according to claim 3, wherein finding the reference pulse includes:

normalizing all pulses based on a maximum amplitude of the pulse;

determining a respective maximum amplitude and a respective minimum amplitude for each normalized pulse;

determining a median maximum amplitude of the respective maximum amplitude and a median minimum amplitude of the respective minimum amplitude of all the normalized pulses;

selecting representative pulses corresponding to pulses whose respective maximum and minimum amplitudes differ from the respective median amplitudes by less than a predetermined value; and selecting the reference pulse out of the representative pulses, as the pulse with the lowest energy integral inside specified areas located before and after the extrema and representing parts of the pulse that are known to be unaffected by reflections.

5. The method according to claim 1, wherein clustering the time-shifted waveforms includes clustering all measurements within one or more specified time windows of the time-shifted waveforms into a predefined number of groups such that measurements in each group correspond to at least one different characteristic property of a material between the wellbore and the casing.

6. The method according to claim 5, including using dynamic time warping (DTW) as a distance metric in hierarchical clustering to compare the time-shifted waveforms and to preserve both amplitude and phase information.

7. The method according to claim 1, wherein clustering is configured to generate four clusters relating respectively to (i) fluid filled large annulus behind the partition, (ii) solid bonding behind the partition; (iii) micro annulus; and (iv) variations in fluid density or additional bonding.

8. The method according to claim 1, including evaluating waveforms in each cluster by applying signal decomposition to separate single components from a composite wave-form comprising a sample-wise superposition from multiple pulses.

9. The method according to claim 8, wherein applying signal decomposition includes:

recreating the waveforms in each cluster from one or more template pulses by scaling amplitude and time of each template pulse to produce respective adjusted pulses;

combining the adjusted pulses to form a composite waveform and re-scaling the amplitude and time of the adjusted pulses as necessary until the composite waveform best fits the waveform corresponding to the waveforms in each cluster.

10. The method according to claim 9, wherein the template pulse is a reference pulse corresponding to the flexural waveform without any secondary reflections and obtained from fluid behind the partition, said reference pulse being represented by a flexural wave having a smooth Gaussian shape.

11. The method according to claim 10, wherein the reference pulse is obtained by:

normalizing all pulses based on a maximum amplitude of the pulse;

determining a respective maximum amplitude and a respective minimum amplitude for each normalized pulse;

determining a median maximum amplitude of the respective maximum amplitude and a median minimum amplitude of the respective minimum amplitude of all the normalized pulses;

selecting representative pulses corresponding to pulses whose respective maximum and minimum amplitudes differ from the respective median amplitudes by less than a predetermined value; and selecting the reference pulse out of the representative pulses, as the pulse with the lowest energy integral inside specified areas located before and after the extrema and representing parts of the pulse that are known to be unaffected by reflections.

12. The method according to claim 9, wherein a minimum number of said template pulses required to recreate the waveforms in each cluster is used to determine whether or not the boundary point corresponds to a micro annulus.

13. The method according to claim 9, further including displaying a 2-dimensional plot, where the y-axis displays the depth in the well and the x-axis displays the azimuthal direction and wherein each datapoint in the array is assigned a value that is indicative of the material and/or the geometrical structure behind the partition.

14. The method according to claim 13, further including calculating from the cluster identified as solid bonding a length of isolation provided by the solid bonding in the well.

15. The method according to claim 13, further including estimating a shortest path for oil and gas to leak up to the surface.

16. The method according to claim 13, wherein estimating a shortest path for oil and gas to leak up to the surface includes:
- receiving as input an array with size (M, N), indicating if each cell is either fluid (0) or solid (1); and
- starting at the bottom row of the array (i=1) and moving upward, increasing i for each step performing two searches at each row, from left to right in the array and from right to left.

17. The method according to claim 16, further including:
- for each cell in the row utilizing the minimum of these two searches; and
- iteratively computing the length of the shortest path from the bottom of the array (row 1) to a given cell in a higher row of the matrix.

18. A computer program product comprising a non-transitory computer-readable medium storing program code instructions, which when executed on at least one processor that receives as input data representative of the recorded ultrasonic waveforms from a pair of spaced apart receivers, carries out the method of claim 1.

* * * * *